April 17, 1956 F. E. BRIDGES 2,742,012
PONTOONS
Filed Feb. 14, 1952 8 Sheets-Sheet 1

INVENTOR
FRANCIS ERNEST BRIDGES
BY
ATTORNEYS

April 17, 1956  F. E. BRIDGES  2,742,012
PONTOONS
Filed Feb. 14, 1952  8 Sheets-Sheet 3

Inventor
Francis Ernest Bridges
By Moses, Nolte, Crewo + Berry
Attorneys

April 17, 1956  F. E. BRIDGES  2,742,012
PONTOONS

Filed Feb. 14, 1952  8 Sheets-Sheet 5

Inventor
Francis Ernest Bridges
By Moses, Nolte, Crews & Berry
attorneys

April 17, 1956   F. E. BRIDGES   2,742,012
PONTOONS

Filed Feb. 14, 1952   8 Sheets-Sheet 6

Inventor
Francis Ernest Bridges
By Moses, Nolte, Crews & Berry
Attorneys

April 17, 1956  F. E. BRIDGES  2,742,012
PONTOONS
Filed Feb. 14, 1952  8 Sheets-Sheet 7
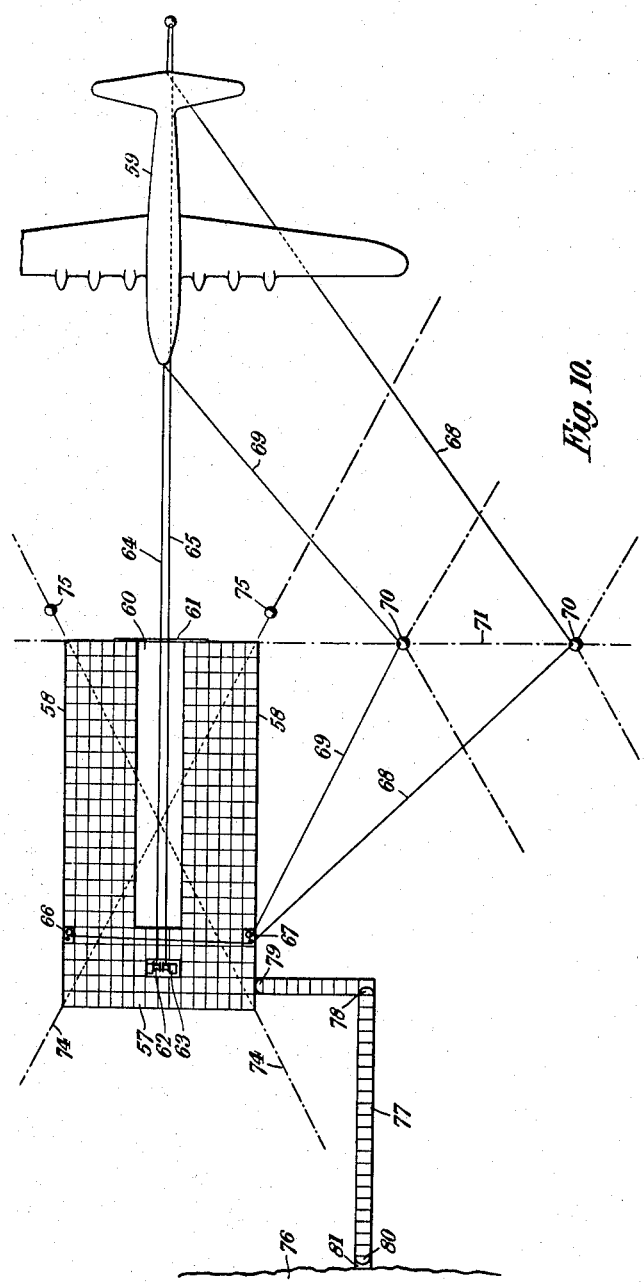
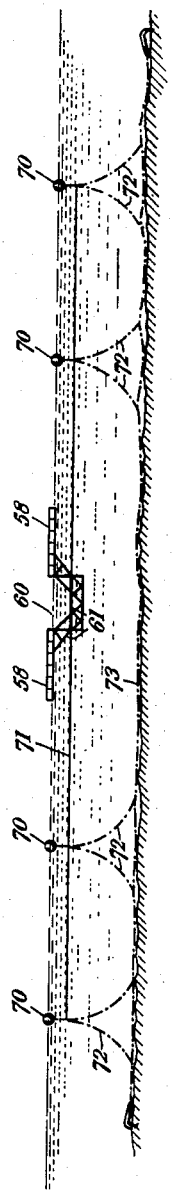
Fig. 10.
Fig. 11.
Inventor
Francis Ernest Bridges
By Moses, Nolte, Crews & Berry
Attorneys April 17, 1956   F. E. BRIDGES   2,742,012
PONTOONS
Filed Feb. 14, 1952   8 Sheets-Sheet 8

Inventor
Francis Ernest Bridges
By Moses, Nolte, Crews + Berry
Attorneys

United States Patent Office 2,742,012
Patented Apr. 17, 1956

2,742,012

PONTOONS

Francis Ernest Bridges, Godshill, Isle of Wight, assignor to Saunders-Roe Limited, Osborne, Isle of Wight, England, a British company Application February 14, 1952, Serial No. 271,535

Claims priority, application Great Britain February 16, 1951

1 Claim. (Cl. 114—.5)

The object of this invention is to provide a portable floating dock or pontoon for marine aircraft or other marine craft which is built up from a number of standardised units of such size that they can be transported by aircraft and erected to form the dock by unskilled labour and without recourse to specialised plant and tools.

By the use of such units it is possible to provide at short notice docking, maintenance and embarkation facilities for marine aircraft at places where no permanent docking facilities are available. Not only can the dock according to the invention be quickly and easily assembled and moored, but it can also be equally quickly dismantled and removed.

The standardised units from which the dock pontoon according to the invention is built, consist each of a metal box, comprising side and end members which can be united together by bolting, a top platform arranged to fit on top of the box, at least one inflatable bag or other float to fit inside the box and impart buoyancy thereto, a structure shaped to the form of the bag which is attachable to the box and members projecting from the side and end members of the box and serving to attach adjoining units together.

The invention will now be described in further detail, by way of example, with reference to the accompanying drawings, in which—

Figure 1:
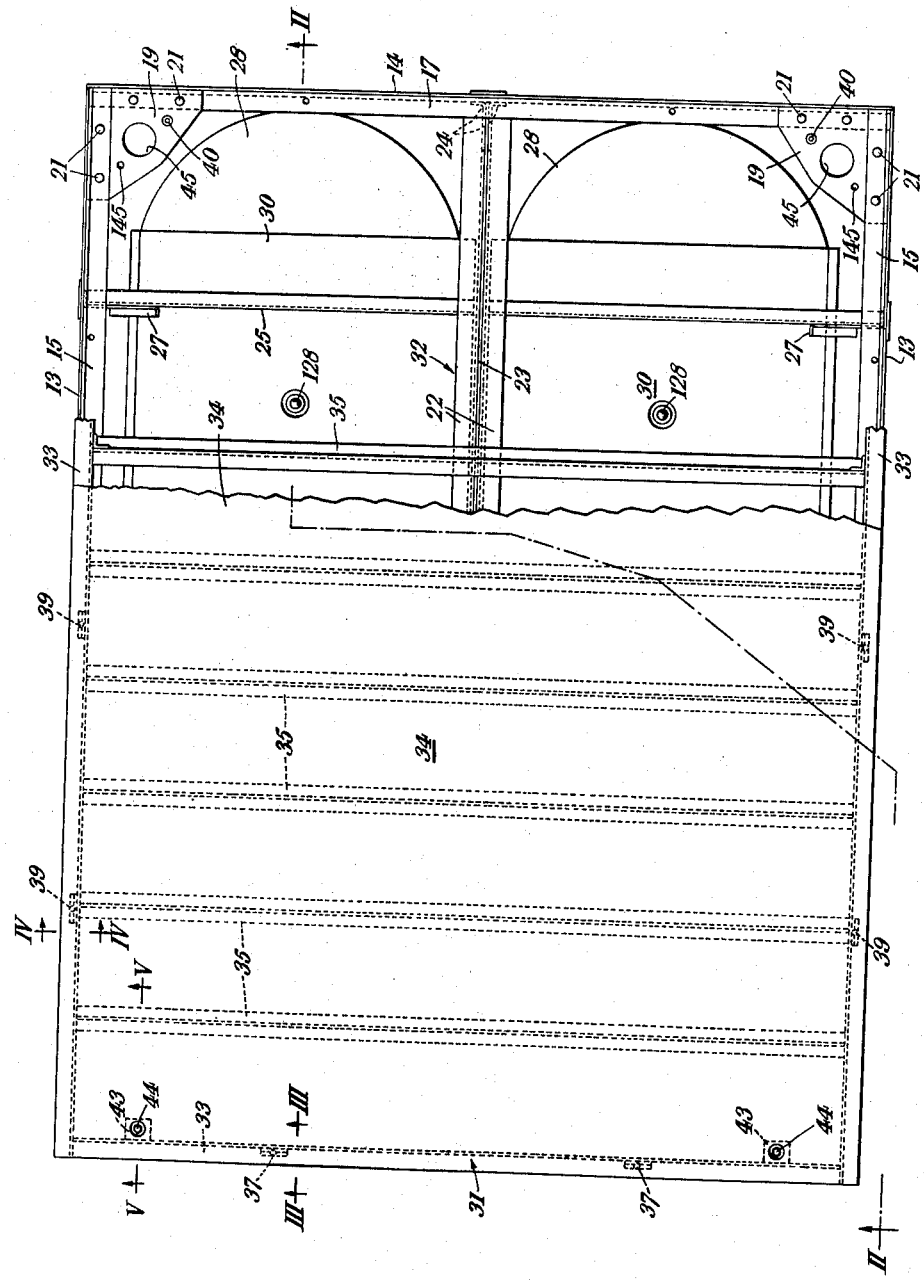
Figure 2:
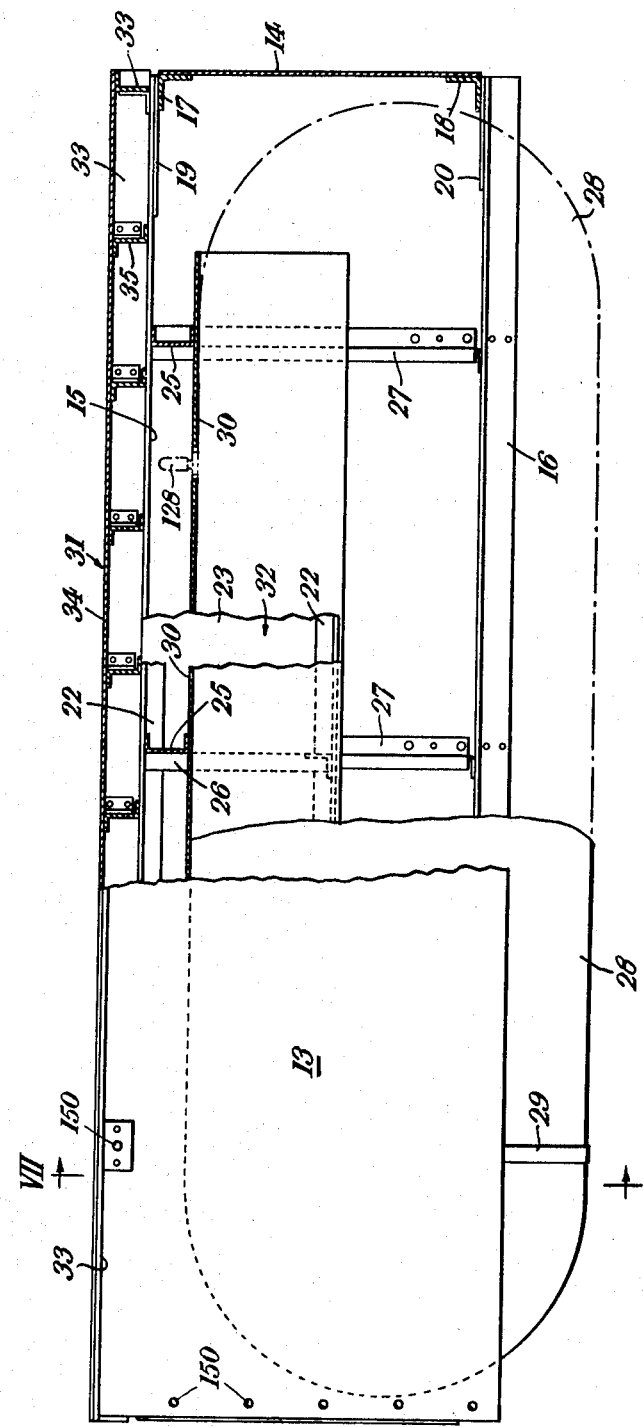
Figure 3:
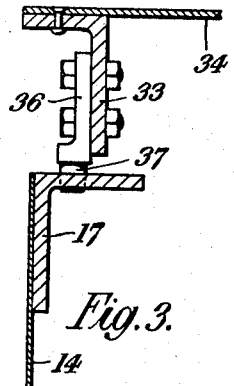
Figure 6:
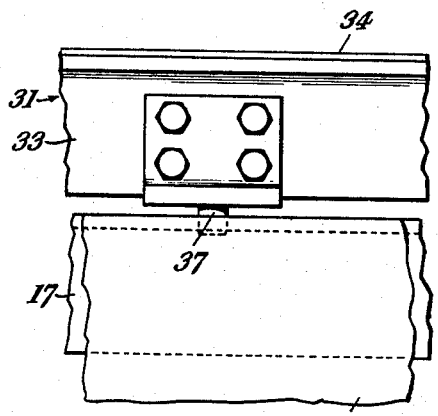
Figure 4:
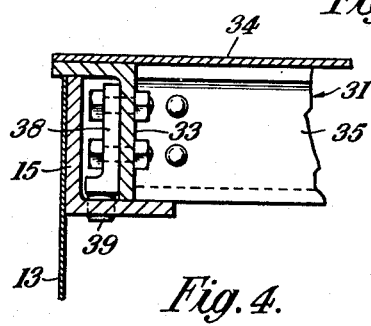
Figure 7:
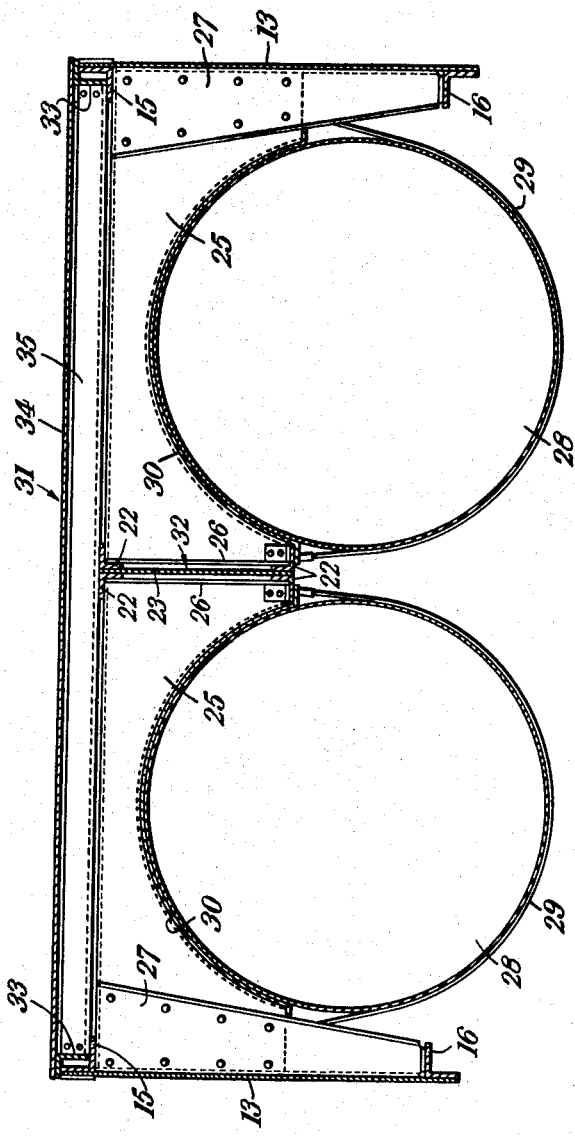
Figure 8:
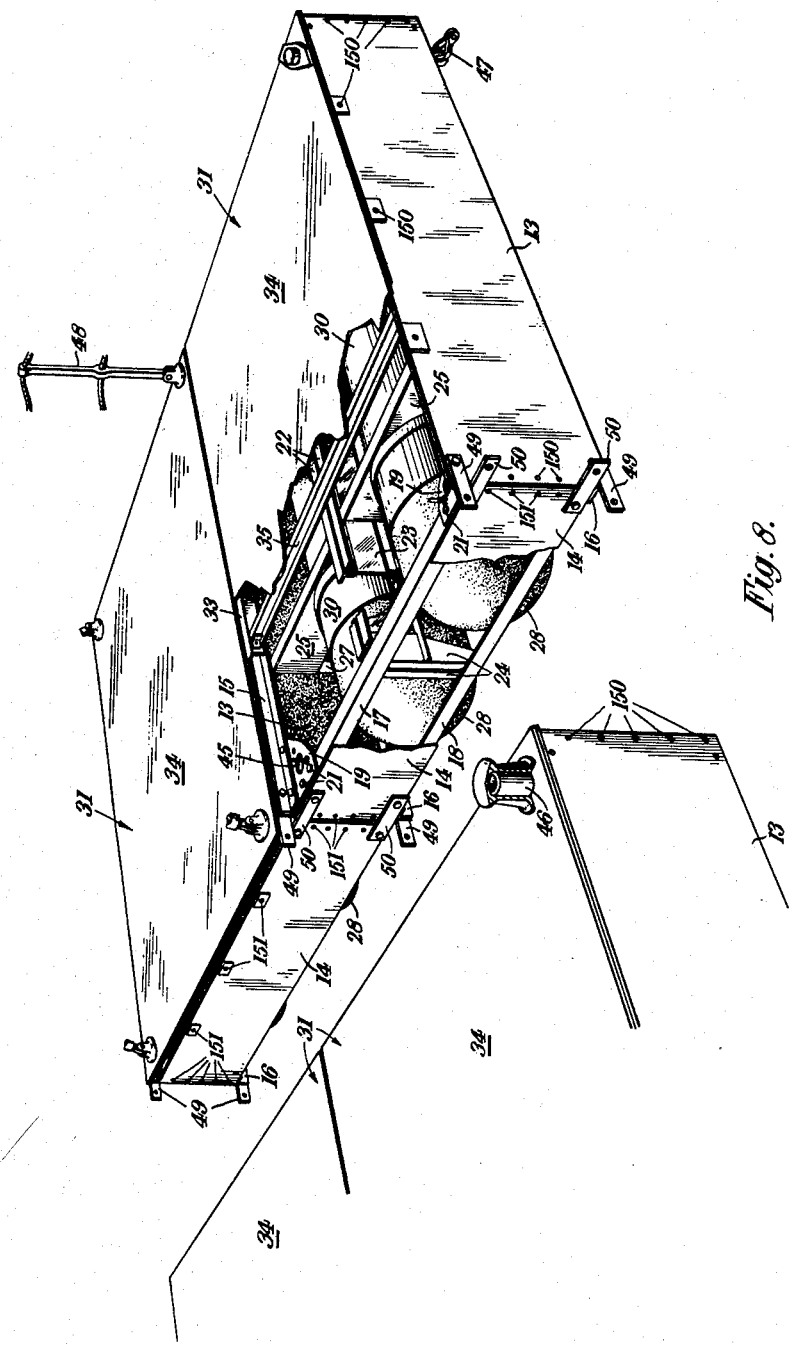
Figure 9:
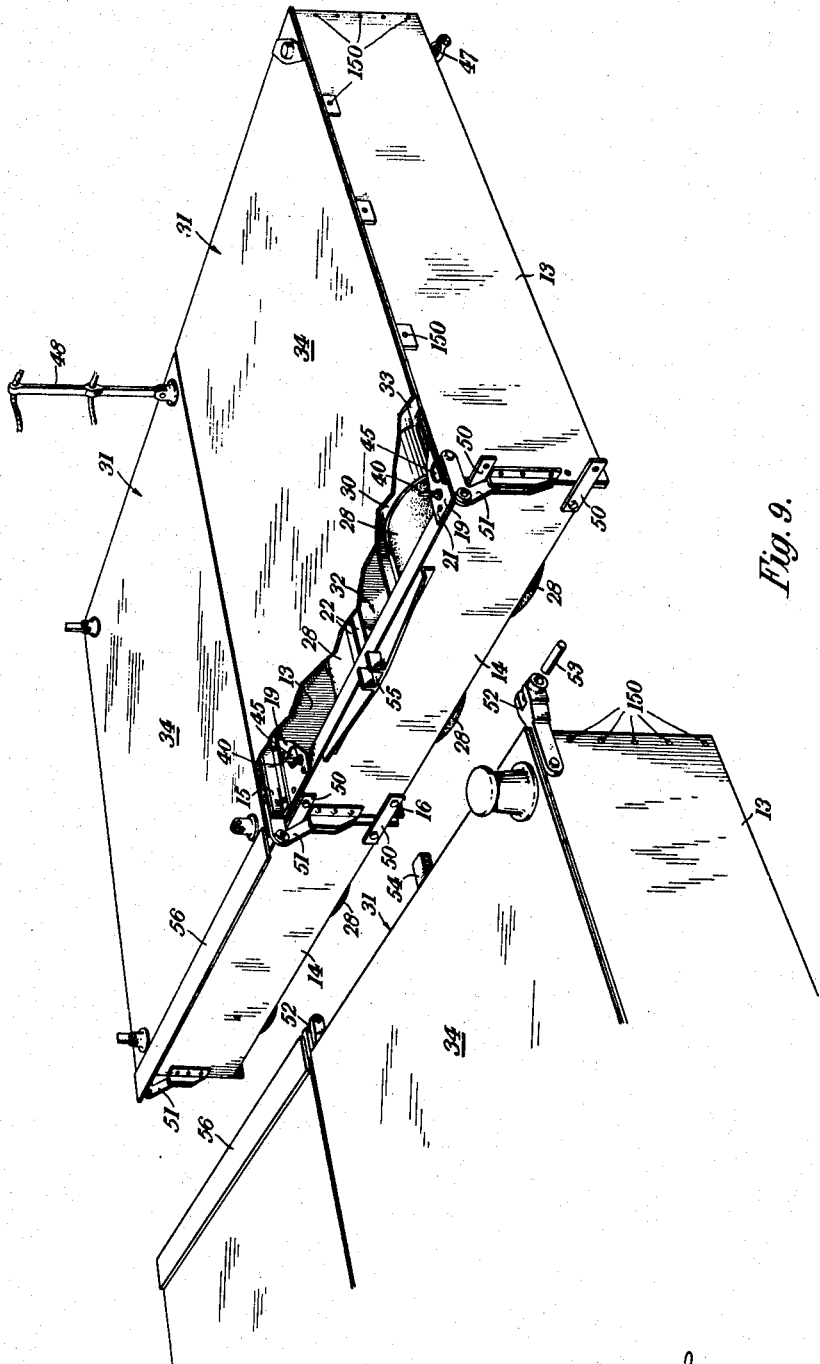
Figure 12:
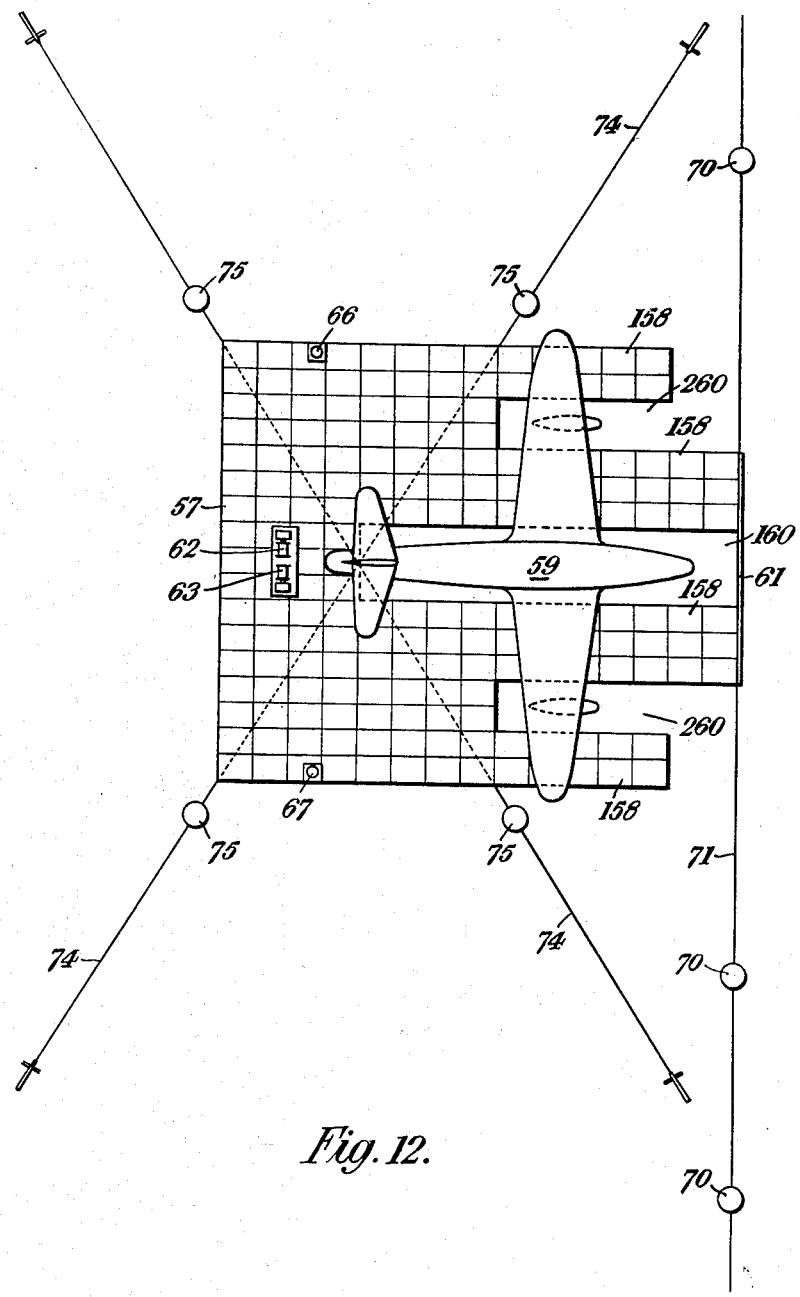

Fig. 1 is a plan view, partly broken away, of one of the component units of the dock or pontoon, Fig. 2 is a view taken on the line II—II in Fig. 1, Figs. 3–5 are sections taken respectively on the lines III—III, IV—IV and V—V in Fig. 1, Fig. 6 is a view looking from the left-hand side of Fig. 3, Fig. 7 is a section taken on the line VII—VII in Fig. 2, Figs. 8 and 9 are perspective views, partly in section, showing alternative methods of joining the units together, Fig. 10 is a plan view of one form of floating dock built up from the units shown in Figs. 1–7, Fig. 11 is a view looking from the right-hand side of Fig. 10 illustrating the mooring arrangements employed, and Fig. 12 is a plan view of an alternative form of floating dock built up from the units shown in Figs. 1–7.

Like reference characters designate like parts throughout the figures. For clarity in the drawings, the bolts employed for joining component parts of the units on the site are largely omitted.

Each unit from which the floating dock or pontoon is constructed, is constituted by a sheet metal box consisting of pre-drilled parts which can be assembled by bolting on the site.

Each unit comprises a pair of side panels 13 and a pair of end panels 14 which are made of light alloy sheet. The side panels 13 are 8 feet long and have light alloy angle sections 15, 16 fitted to their inner faces at top and bottom respectively. The end panels 14 are 6 feet long, and likewise have light alloy angle sections 17, 18 fitted to them at top and bottom respectively.

The depth of the panels is approximately 2 ft. 4½ ins. When the four panels 13, 14 are placed together, the angle sections 17, 18 on the end panels lie just inside the angle sections 15, 16 on the side panels, as shown in Fig. 2, and the panels are then joined by corner gusset plates, four 19 at the top and four 20 at the bottom. The gusset plates are fitted in position by means of bolts 21 (see Fig. 8) inserted in pre-drilled holes in the angle sections and in the gusset plates. The gusset plates 19, 20 lie between the angle sections on the side and end panels, as shown in Fig. 8 for the top gusset plates 19.

The box includes a centre beam 32, also of light alloy and consisting of four angle sections 22 and a metal sheet 23 (see Figs. 7 and 8), which extends parallel to the side panels 13 and has a pair of angle section end plates 24 (see Figs. 1 and 8) rivetted to each of its opposite ends. These end plates 24 extend for almost the full depth of the box and are bolted to the end panels 14 to secure the centre beam in position. Three pairs of light metal arches 25 (Fig. 7) are provided, these extending parallel to the end panels 14 between the centre beam 32 and the side panels 13, three arches being disposed on each side of the centre beam. The arches 25 of each pair, which are in alignment with one another, have flanged ends 26 which are secured to the centre beam 32 and they are secured at the outer ends to the side panels 13 by gusset plates 27. The arches 25 may be replaced by straps similar to those, 29, referred to below.

At each side of the centre beam is a rubberised canvas flotation bag 28 approximately 7 ft. 9 ins. long and 2 ft. 6 ins. in diameter. Each bag 28 is supported from the three arches above it by rubber covered metal straps 29, and a light alloy sheet metal pan 30 is disposed between the upper surface of the bag and the arches. Each bag 28 is provided with a valve 128 for inflation and deflation, so positioned that it is accessible for inspection and topping up by removing small covers (not shown) in the top of the units. The inflatable flotation bags 28 may be replaced by other types of float, for instance floats made of sponge rubber.

Each unit includes a top platform 31, constituted by a rectangular angle section framework 33, a metal sheet 34 fixed at its edges to the framework, and transverse Z-section stringers 35 beneath the sheet. At intervals along the ends of the angle framework 33 are provided cleats 36 (Fig. 3) fitted with shear dowels 37 for engaging holes in the top angles 17 of the end panels. Similar cleats 38 (Fig. 4) fitted to the sides of the angle framework 33 have shear dowels 39 for engaging holes in the top angles 15 of the side panels.

Figure 5:
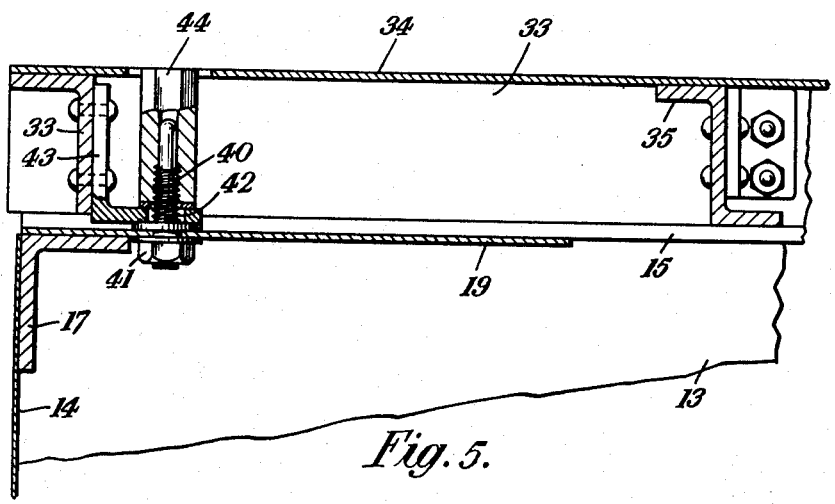

As shown in Fig. 5, each of the upper corner gusset plates 19 carries an upstanding bolt 40, secured thereto by a nut 41. When the top platform is placed in position on the unit the bolt 40 projects through a hole 42 in a bracket 43 fixed to the angle frame-work 33. The top platform is then secured to the unit by screwing nuts 44 on to the bolts 40 as shown in Fig. 5.

If desired, as an alternative to the construction shown, the top platform can be made in two halves which are separately bolted to the unit.

It will be appreciated that the units can be readily and rapidly assembled from their component parts simply by bolting, and can be taken apart again equally readily when required. Thus, if a flotation bag 28 becomes deflated through damage, the top platform 32 of the unit in question can easily be removed to give access to the bag for replacement purposes.

Each of the top gusset plates 19 has a large central hole 45 (Fig. 1), into which a bollard tube 46 (Fig. 8) may be inserted through a corresponding hole (not shown) in the plating 34 of the top platform, also an additional hole 145 for fitting attachment bolts. Mooring attachments 47 may also be secured in these holes 45, and in corresponding holes in the bottom gusset plates 20, likewise as shown in Fig. 8. Hand rail stanchions 48 or lamp standards may be inserted into the holes 145 in the top gusset plates 19 if so desired.

Adjoining units may be secured together to form a dock or pontoon by bolting them together at top and bottom by means of fishplates 49, 50 as shown in Fig. 8, and by means of bolts fitted into holes 150, 151 in the side and end panels respectively. As an alternative, where it is desired to permit of some degree of hinging of the components of the dock, as for example in the case of a floating gangway leading to the dock from the shore, the fishplates 49 may be replaced by the attachments shown in Fig. 9, and the bolt holes 151 are not required. The outriggers consist of male hinge outriggers 51 at the upper ends of the end panels of the units which are received in corresponding female hinge outriggers 52 on the adjoining units and are joined together by inserting pins 53 through them. In this case the adjoining units carry cooperating male and female horizontal shear fittings 54, 55. They are also fitted with tread plates 56 for bridging the gap between them. By the use of these standardised units a variety of shapes of dock may be constructed, as indicated for example in Figs. 10 and 12. In the construction shown in Fig. 10 the dock consists of a dock head 57, constituted by a rigid platform made up of a number of the above-described units bolted together, and two arms 58 defining between them a bay 60 to accommodate the aircraft 59. I prefer to make each arm 58 of a number of rigid sections, each made of a number of units secured together as indicated in Fig. 8, these sections being joined along lines transverse to the length of the bay by hinged joints as indicated in Fig. 9. This allows the dock to accommodate itself to waves without being subjected to undue stresses. The open end of the dock it fitted with a bracing girder structure (see Fig. 11), tying the extremities of the two arms together, to relieve lateral bending due to wind and tide. The bracing girder structure 61 is sufficiently submerged to clear the bottom of the aircraft.

Mention has already been made of the provision at the four corners of each standard unit for the attachment of bollards, hand-rail stanchions, and lamp-standards. Provision for the attachment of fenders may also be provided along the sides and ends of the unit. These can be arranged by the operator, to suit his individual requirements, without any alteration to the units.

On the dock head 57 are winches 62, 63, for winding in towing cables 64, 65 attached respectively to the nose and to the tail of the aircraft, and capstans 66, 67 for winding in cables 68, 69 attached respectively to the tail and nose of the aircraft. The cables 68, 69 pass around buoys 70, attached to an underwater cable 71 (Fig. 11) which, in turn, is secured by chains 72 to a chain 73 anchored to the sea bed. Underwater cables 74, secured to a chain anchored to the sea bed in similar fashion to the cable 71 serve for mooring the dock. The cables 74 carry buoys 75.

Specially reinforced platforms are provided for the units supporting the winches 62, 63 and capstans 64, 65. Although stronger than the corresponding platforms provided for the other units they are interchangeable with them.

The dock in Fig. 10 is shown connected to the shore 76 by a floating gangway 77 made up of the same standard units as the dock itself. This gangway is L-shaped, in plán view, and is free to hinge at 78 so that it can accommodate itself to any drift or rotation of the dock under the effects of wind and tide. As an alternative the gangway may be straight. The ends 79, 80 of the gangway 77 are hinged to the dock and to the shore attachment 81 respectively, and additional hinges may be fitted along it length, as indicated in Fig. 9, to increase flexibility.

Additional protection is provided beneath the units used as a gangway, which may rest on the sea bed at low tide, to protect the flotation-bags.

The dock shown in Fig. 12 is constructed in similar fashion to that shown in Fig. 10, except that it has four arms 158, defining a main bay 160 to accommodate the hull of the aircraft 59 and subsidiary bays 260 to accommodate the wing tip floats.

What I claim as my invention and desire to secure by Letters Patent is:

An open-bottomed box unit, for use in the construction of a floating dock or pontoon, comprising metal side and end panels separably fastened together, a metal top platform separably connected to said side and end panels, two longitudinally extending flotation bags disposed within said box unit, a centre metal beam disposed beneath said top plate, end plates fixed to the ends of said centre beam, bolts securing each of said end plates to the adjoining end panel, a metal supporting structure disposed beneath and secured to said centre beam, and including a plurality of pairs of metal arches, fitted between the centre beam and the side panels, the arches of each pair being aligned with one another and having flanged ends, means securing the inner flanged ends of said arches to said centre beam, gusset plates securing the outer flanged ends of said arches to the side panels, and means for detachably supporting said flotation bags with their upper surfaces embraced by said arches.

References Cited in the file of this patent

UNITED STATES PATENTS

| 522,348 | Martini | July 3, 1894 |
| 1,001,372 | Rist | Dec. 12, 1911 |
| 1,116,894 | Karr | Nov. 10, 1914 |
| 1,896,546 | Kulik | Feb. 7, 1933 |
| 1,927,124 | Jones | Sept. 19, 1933 |
| 2,051,281 | Webber | Aug. 18, 1936 |
| 2,314,624 | Macaulay | Mar. 23, 1943 |
| 2,394,764 | Greulich | Feb. 12, 1946 |
| 2,423,832 | Gearon | July 15, 1947 |
| 2,453,155 | Nelson | Nov. 9, 1948 |
| 2,480,144 | Laycock | Aug. 30, 1949 |

FOREIGN PATENTS

| 10,569 | Great Britain | July 21, 1915 |